United States Patent
Freeman

(10) Patent No.: US 8,532,825 B1
(45) Date of Patent: Sep. 10, 2013

(54) SOFTWARE COMPENSATION FOR KINEMATICALLY SINGULAR MACHINES

(75) Inventor: Philip L. Freeman, Maryland Heights, MO (US)

(73) Assignee: The Boeing Company, Chicago, IL (US)

(*) Notice: Subject to any disclaimer, the term of this patent is extended or adjusted under 35 U.S.C. 154(b) by 300 days.

(21) Appl. No.: 12/868,544

(22) Filed: Aug. 25, 2010

(51) Int. Cl.
*G05B 11/00* (2006.01)

(52) U.S. Cl.
USPC .......................................... 700/263

(58) Field of Classification Search
USPC .......................................... 700/263
See application file for complete search history.

(56) References Cited

U.S. PATENT DOCUMENTS

| | | | | |
|---|---|---|---|---|
| 5,023,808 | A * | 6/1991 | Seraji | 700/248 |
| 5,276,390 | A * | 1/1994 | Fisher et al. | 318/568.1 |
| 7,571,027 | B2 * | 8/2009 | Freeman | 700/265 |
| 2006/0271241 | A1 * | 11/2006 | Freeman | 700/265 |
| 2007/0112468 | A1 * | 5/2007 | Freeman | 700/265 |
| 2009/0271028 | A1 * | 10/2009 | Freeman | 700/193 |
| 2010/0228396 | A1 * | 9/2010 | Pechev | 700/263 |
| 2011/0087374 | A1 * | 4/2011 | Ando et al. | 700/260 |
| 2012/0022690 | A1 * | 1/2012 | Ooga et al. | 700/258 |
| 2012/0150347 | A1 * | 6/2012 | Ohga et al. | 700/254 |

OTHER PUBLICATIONS

Buss, "Introduction to Inverse Kinematics with Jacobian Transpose, Pseudoinverse and Damped Least Squares methods" (Oct. 2009).
Buss et al., "Selectively Damped Least Squares for Inverse Kinematics" Journal of Graphics, GPU, & Game Tools, 10 (3):37-49, Jan. 2005.
Siemens AG, "Sinumerik 840D Function description VCS Volumetric Compensation System" (Apr. 2009).
Hanqi Zhuang et al., "Camera-Aided Robot Calibration," CRC Press, 1996.

* cited by examiner

Primary Examiner — Khoi Tran
Assistant Examiner — Adam Mott
(74) Attorney, Agent, or Firm — Hugh P. Gortler

(57) ABSTRACT

A software compensation command is generated to command a linkage to move an end body in a work space. A manipulator Jacobian is computed given a nominal linkage command; and a normalized Jacobian is computed from the manipulator Jacobian, a joint space normalizing matrix Q, and an error space normalizing matrix E. The normalized Jacobian and the Q and E matrices are used to produce the software compensation command.

34 Claims, 4 Drawing Sheets

SOFTWARE COMPENSATION FOR KINEMATICALLY SINGULAR MACHINES

BACKGROUND

The aerospace industry uses numerically controlled (NC), multi-axis machine tools to fabricate high precision parts. A typical NC multi-axis machine tool includes a kinematic linkage for positioning and orienting a tool relative to a work piece. A 5-axis machine tool, for instance, can move a tool tip along x, y and z axes, and rotate the tool tip about the x and y axes.

These machine tools are now being specified and built to achieve a particular volumetric accuracy necessary to properly execute an intended process or job. For example, a machined part may have a surface location tolerance of ±0.010". A multi-axis machine tool would be required to position a tool tip to better than ±0.010" within a working volume. However, most machine tools do not have such mechanical accuracy built in. Therefore, software compensation is used to attain the required accuracy.

As the tool tip moves towards a singular region, the linkage might be commanded to produce large joint motions. This is problematic. The large joint motions might be physically unrealizable since machine joints have velocity and acceleration constraints. In addition, since the compensation is effectively unplanned motion, collisions with obstacles are risked.

Measures can be taken to avoid large joint motions. For example, the well known Linear-Quadratic Regulator (LQR) method of optimal control uses weighting matrices to minimize joint penalty far from the singular regions, and maximize joint and error penalty when close to a singular region, but only in the singular direction.

However, the weighting matrices are static. That is, they are designed ahead of time. Consequently, the LQR method can produce compensation that is heavily damped even though little damping is needed, or it can produce excessive joint motion when close to a singular region.

SUMMARY

According to an embodiment herein, a method of commanding a linkage to move an end body in a work space comprises computing a manipulator Jacobian given a nominal linkage command; computing a normalized Jacobian from the manipulator Jacobian, a joint space normalizing matrix Q, and an error space normalizing matrix E; and using the normalized Jacobian and the Q and E matrices to produce a software compensation command.

According to another embodiment herein, a method of commanding a linkage to move an end body in a space comprises computing a manipulator Jacobian $J_n$ given a nominal linkage command q; computing a singular value decomposition of the Jacobian to produce a diagonal matrix of singular values; and calculating an approximation S† of the inverse of the S matrix, where $$S^\dagger = \text{diag}\left(\frac{\sigma_i^2}{\sigma_i^3 + \sigma_1^3/w}\right),$$

where $\sigma_i$ is the $i^{th}$ singular value and $\sigma_1$ is the largest singular value in the S matrix. The method further comprises using the approximation S† to produce a software compensation command.

According to another embodiment herein, a machine comprises a kinematic linage for moving an end body to a pose; and a controller for generating a software compensation command $\Delta q$ for the kinematic linkage given a nominal linkage command q. Generating the software compensation command $\Delta q$ includes computing a manipulator Jacobian $J_n$ given the nominal linkage command q; computing a normalized Jacobian $\hat{J}_n$ from the manipulator Jacobian $J_n$, a joint space normalizing matrix Q, and an error space normalizing matrix E; identifying singular values, left singular vectors, and right singular vectors of the normalized Jacobian; and using the singular values, singular vectors, and the Q and E matrices to determine a software compensation command $\Delta q$ for the linkage.

According to another embodiment herein, an article comprises a processor and memory encoded with data for causing the processor to generate a software compensation command given a nominal linkage command. Generating the software compensation command includes computing a manipulator Jacobian given a nominal linkage command; computing a normalized Jacobian from the manipulator Jacobian, a joint space normalizing matrix Q, and an error space normalizing matrix E; and using the normalized Jacobian and the Q and E matrices to produce a software compensation command.

DETAILED DESCRIPTION

Figure 1:
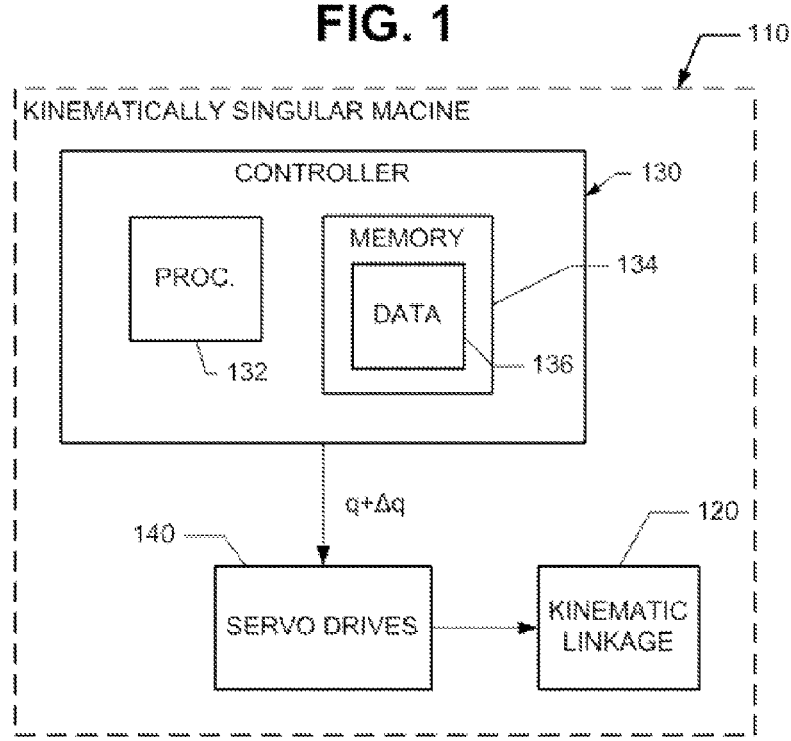
FIG. 1 is an illustration of a kinematically singular machine.

Reference is made to FIG. 1, which illustrates a kinematically singular machine 110 including a kinematic linkage 120 that moves an end body in a work space. The end body may be a body at the end of the linkage 120 (e.g., a tool), or it may refer to the end of the linkage 120. The kinematic linkage 120 has multiple degrees of freedom for changing the location and orientation (that is, pose) of the end body.

The machine 110 further includes a controller 130 for generating linkage commands q+$\Delta q$, which are sent to servo drives 140. In response to the linkage commands q+$\Delta q$, the servo drives 140 cause the linkage 120 to move the end body to a commanded pose. The vector q is a nominal linkage command, which describes the desired pose of the linkage 120 at a given time. The vector $\Delta q$ is a software compensation command for achieving the desired end body pose within a required volumetric accuracy.

The controller 130 is not limited to any particular construction. For example, the controller 130 may include a processor 132 and memory 134 encoded with data 136 for causing the processor 132 to generate the software compensation commands q+$\Delta q$.

Figure 2:
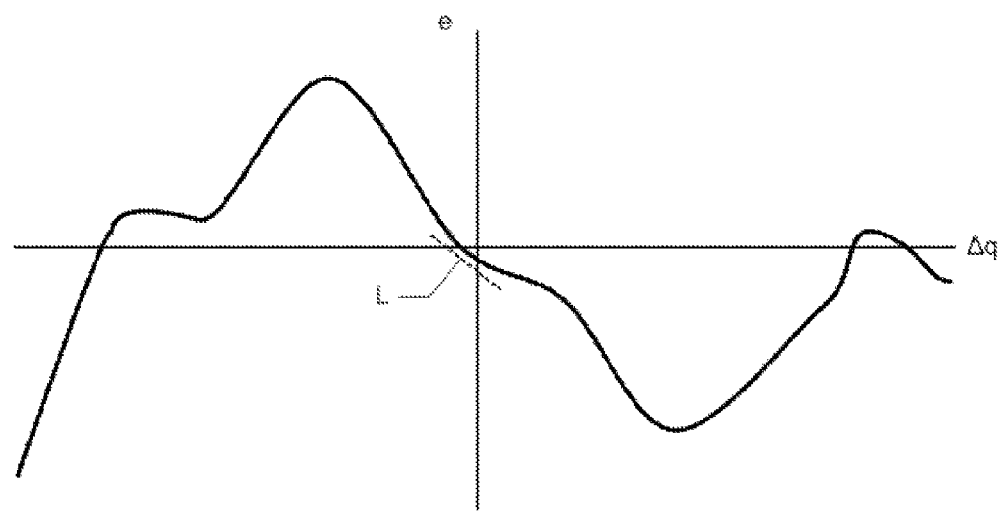
FIG. 2 is an illustration of error as a function of a nominal linkage command.

For a machine 110 with n axes positioning a rigid end body in space, the forward kinematic equations can be modeled as a function mapping joint commands to tool pose:

$$f(q,e(q)):R_q^n \mapsto T_x$$

where e(q) denotes a vector of errors associated with the nominal linkage command q, $R_q^n$ represents the linkage space, and x and $T_x$ represents the pose of the end body. FIG. 2 provides an example of error e as a function of the nominal linkage command q.

The controller 130 determines a correction to the nominal linkage command that results in the machine 110 achieving a desired end body pose in the workspace of the end body. This correction is the software compensation command Δq. The workspace of the end body will be denoted by $T_t$. The end body space $T_t$ is always at the end body and the Z axis is aligned to the axis of the end body. The X and Y axes are rather arbitrary. For example, if the end body is a tool tip that is oriented with respect to a workpiece, the X and Y axes can be chosen to align with the X and Y axes of the workpiece coordinate system when the linkage 120 is commanded to q=0.

From this, the pose vector x of the end body fully describes the transform $T_x \mapsto T_t$. Thus, given a nominal pose of a linkage ($x_{nom}$) and a desired pose of the linkage ($x_{act}$), and representing $x_{nom}$ and $x_{act}$ as homogenous transform matrices $X_{nom}$ and $X_{act}$, the error transformation E is $E=X_{nom}^{-1}X_{act}$. The error transformation E is expressed with respect to the end body workspace $T_t$. Thus, the minimal set of error vectors e does not change with orientation of the end body. The error transformation E can be transformed back to a pose error vector e.

The controller 130 finds a compensation command Δq that maps to −e. The command q+Δq allows the machine 110 to achieve a particular volumetric accuracy.

Additional reference is made to FIG. 2. The compensation command Δq is derived from a linearized region L of the error e (FIG. 2 shows the linearized region L in dash). The linearized region L may be represented by a manipulator Jacobian, which provides a linear function that maps joint motion to end body motion as $\Delta x=J_n(q)\Delta q$ and, therefore, maps the compensation command to −e (that is, $J_n(q)\Delta q=-e$).

The controller 130 computes the manipulator Jacobian. However, one problem with the manipulator Jacobian is that it treats the same error values for rotation and translation as equivalent, and it also treats the same error values for different scales as equivalent. For example, the manipulator Jacobian treats errors of 0.001 mm, 0.001 inches and 0.001 degrees as equivalent errors. Consider a value of 0.010 mm, along with a value of 0.005 degrees. A minimization of the sum of the squares will push the compensation command Δq towards one which minimizes the linear value at the expense of the angular value ($0.010^2=0.0001$; and $0.005^2=0.000025$). Thus, the linear value penalizes the sum of the squares by four times as much as the angular error. Consequently, an extremely large joint motion might result in the direction of a singularity. Moreover, the condition number of the Jacobian may be larger for a given pose of the end body, and the resulting compensation command Δq may be heavily damped when little damping is needed.

To overcome this problem, the controller 130 computes a normalized Jacobian $\hat{J}_n$ from the manipulator Jacobian $J_n$. Normalizing the manipulator Jacobian $J_n$ allows an accurate comparison of different types of joint motion (e.g., revolute versus prismatic). It also allows comparison of different units (e.g., millimeters vs. inches vs. degrees) and controls the relative accuracy of compensation against joint motion.

The controller 130 computes the compensation command Δq from the normalized Jacobian $\hat{J}_n$. The compensation command Δq is based on the general problem $$\min \Phi = (\hat{J}_n \Delta q+e)^T Q(\hat{J}_n \Delta Q+e)+(\Delta q)^T G(\Delta q)$$

where Q and G represent cost penalties for error and joint motion. An error minimization algorithm (e.g., LQR) is used to minimize Φ.

The controller 130 computes software compensation commands such that G and Q are adaptive, wherein damping is minimized when the end body is far from a singular region, and joint motion is minimized when the end body approaches a singular region. Contrast this to conventional LQR, where G and Q are static.

Figure 3:
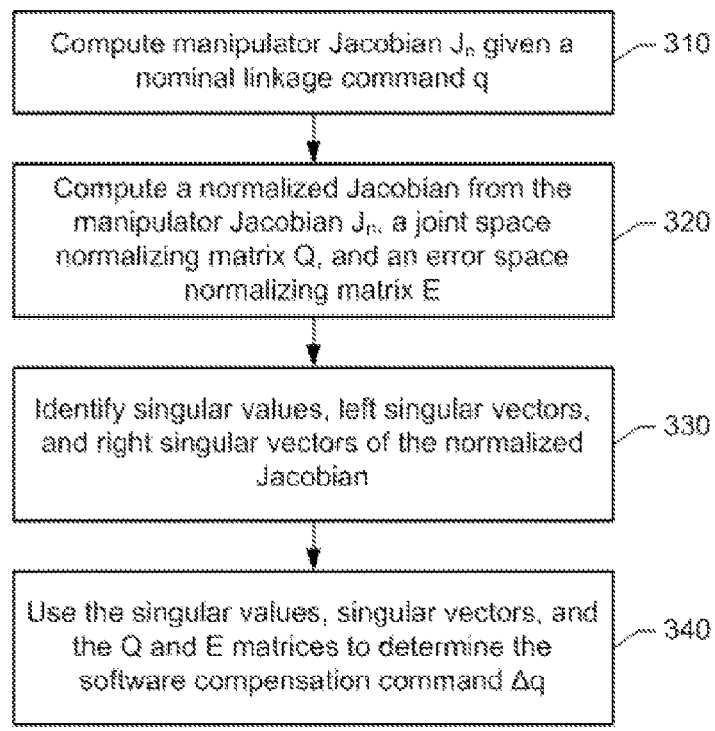
FIG. 3 is an illustration of a method of generating a software compensation command.

Reference is made to FIG. 3, which illustrates a method of computing a software compensation command Δq. At block 310, a manipulator Jacobian $J_n$ is computed given a nominal linkage command q. The subscript n indicates that $J_n$ is the Jacobian of the body-space, not the work-space.

At block 320, a normalized Jacobian $\hat{J}_n$ is computed from the manipulator Jacobian $J_n$, a joint space normalizing matrix Q, and an error space normalizing matrix E. For example, the normalized Jacobian $\hat{J}_n$ is computed as $\hat{J}_n = EJnQ^{-1}$. The Q matrix represents the smallest resolvable step for each axis. The E matrix represents error values that are normalized for the different error directions so that errors which create one linear unit of error in the end body have a normalized value of one.

At block 330, singular values, left singular vectors, and right singular vectors of the normalized Jacobian $\hat{J}_n$ are identified. This step may include computing a singular value decomposition (SVD) of the normalized Jacobian $\hat{J}_n$ to produce $USV^T$, where U and V are orthogonal matrices of the left and right singular vectors and where S is a diagonal matrix of singular values. This step orthogonalizes the software compensation. The end body motion is mapped into a space whose axes are scaled by the singular values of the S matrix. Thus, at a singularity $\sigma_i=0$, the $i^{th}$ axis in the orthogonal space will be annihilated. The right singular vectors are the orthogonal basis vectors for joint motion. The left singular vectors are the orthogonal basis set for end-body motion.

At block 340, the singular values, singular vectors, and the Q and E matrices are used to determine the software compensation command Δq. The compensation command Δq may be computed as $$\Delta q = -Q^{-1}VS^\dagger U^T Ee,$$

where e is the tool tip pose error and $S^\dagger$ is the approximation of the inverse of the S matrix. The approximation $S^\dagger$ may have inverse singular values that penalize singular directions in joint motion more heavily than singular directions in error. The inverse singular values may be adaptively weighted such that the joint motion along the right singular vectors decays along increasingly singular directions. The decay may be the inverse of a cubic function.

Figure 4:
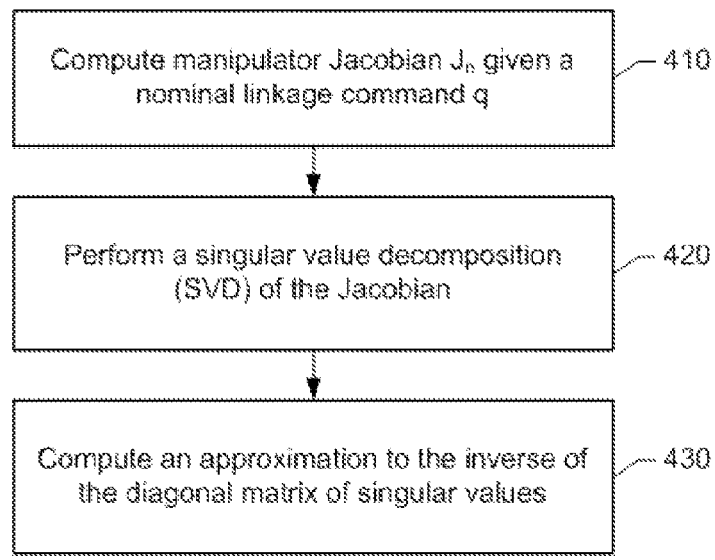
FIG. 4 is an illustration of a method of computing an approximation of the inverse of the diagonal matrix of singular values.

Reference is now made to FIG. 4, which illustrates a method of computing the approximation $S^\dagger$. At block 410, a manipulator Jacobian $J_n$ is computed, given a nominal linkage command q. At block 420, a singular value decomposition (SVD) of the Jacobian is computed to produce a diagonal matrix of singular values.

At block 430, an approximation $S^\dagger$ to the inverse of the S matrix is computed. The approximation S† is computed as $$S^\dagger = \text{diag}\left(\frac{\sigma_i^2}{\sigma_i^3 + 1/\lambda}\right),$$

where $\sigma_i$ is the $i^{th}$ singular value and $\sigma_1$ is the largest singular value in the S matrix. The deviation of $S^\dagger$ from S is a function of the ratio of the $i^{th}$ singular value and the largest singular value.

In some embodiments, $$\frac{1}{\lambda} = \sigma_1^3/w, \text{ whereby } S^\dagger = \text{diag}\left(\frac{\sigma_i^2}{\sigma_i^3 + \sigma_1^3/w}\right).$$

The value w is a design constant. The advantage is that only a single design variable is required. This design variable can be chosen as an order of magnitude estimate. Different values of w can change the asymptotic decay in motion along increasingly singular directions. See, for example, FIG. 6.

Scaling other than $1/\lambda = \sigma_1^3/w$ may be used. In one embodiment, setting $S^\dagger = 1/\sigma_i$ a for all $\sigma_i$ greater than some threshold will provide a numerically stable form of pseudo inverse (ordinary least squares). In another embodiment, setting $$S^\dagger = \text{diag}\left(\frac{\sigma_i}{\sigma_i^2 + \lambda}\right)$$

provides a form for damped least squares.

In some embodiments of FIG. 4, the SVD of the non-normalized Jacobian may be taken.

There is no need to identify all the kinematic singularities of the machine 110 ahead of time because the singularities are those poses where one of the singular values becomes zero. The real-time implementation doesn't need a switching clause (if near singularity . . . else . . . ), as singular and non-singular poses are handled in exactly the same way. Thus, there is no need to identify the singular poses ahead of time for some if-else clause in the control. This is advantageous if the machine 110 has complicated singularities.

The machine 110 is not limited to any particular kinematic linkage. Some embodiments might include a single chain machine, while other embodiments might include a branched manipulator having multiple endpoints. No a priori knowledge of the machine's kinematic structure is required beyond the nominal axis motion stackup, as all components can be calculated at run time in a real-time environment.

The machine 110 is especially useful for multi-axis machine tools that are controlled in real time. For example, the machine could be adapted for a 5-axis machine tool. Volumetric accuracy is the positioning accuracy of the tool tip in a coordinate system that is fixed with respect to the workpiece.

Figure 5:
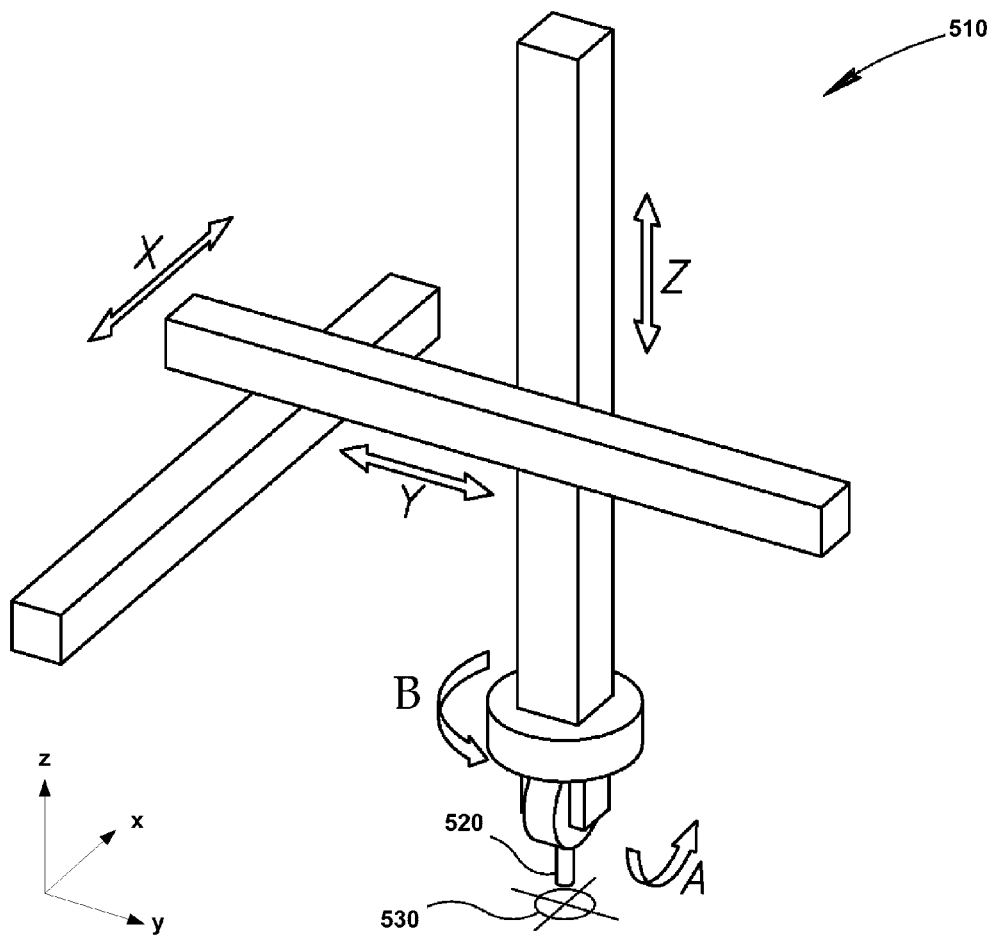
FIG. 5 is an illustration of a kinematic linkage for a 5-axis machine tool.

Reference is now made to FIG. 5, which illustrates a linkage 510 for a 5-axis milling machine having an XYZCA geometry. The linkage 510 can move and orient a tool tip 520 relative to five degrees of freedom: translation in the X, Y and Z directions along three linear axes (x, y and z axes) and rotation in the A and C directions (about the y and z axes). The tool tip 520 is shown as being positioned at a singular point 530 since rotation of the tool tip 520 in the C rotational direction cannot change a position or orientation of the tool tip 520. Accordingly, the five-axis assembly 510 loses a degree of freedom when the tool tip 520 is positioned at the singular point 530.

The nominal linkage command q for the kinematic linkage 510 of FIG. 5 is denoted by $q=[q_x, q_y, q_z, q_a, q_c]$, where subscripts x, y and z denote translational motion and subscripts a and c denote rotational motion. The corresponding pose error for an asymmetric machine is denoted by $e=[e_x, e_y, e_z, e_a, e_c]^T$.

The vectors $\Delta q$ and $e$ are scaled so that unit changes in each dimension have physical meaning. Let $\Delta \hat{q} = \hat{Q}\Delta q$ and $\Delta \hat{e} = \hat{E}\Delta e$.

In a normalized $\Delta q$, a one-unit change in compensation value is equal to the smallest resolvable step for that axis. In some embodiments, joint resolution and the smallest resolvable step are considered to be the same. In other embodiments, measurements of the smallest resolvable step are made.

Consider a machine that will be face milling with a 150 mm cutter. The X and Y directions have a resolution of $0.001/\mu m$. The Z-direction has a resolution of 0.005 mm. The C and A directions have joint resolutions of 0.002 degrees. The normalizing matrix for $\Delta q$ is:

$$\Delta \hat{q} = \begin{bmatrix} 1000 & 0 & 0 & 0 & 0 \\ 0 & 1000 & 0 & 0 & 0 \\ 0 & 0 & 200 & 0 & 0 \\ 0 & 0 & 0 & 500 & 0 \\ 0 & 0 & 0 & 0 & 500 \end{bmatrix} \Delta q$$

Now joint motions equivalent to the motion resolution of the axis have a magnitude of 1.

In a normalized error vector e, the error vector e is blended with distance. Consider milling with a face mill having a radius of 75 mm. An angular error of 1/75 radians will cause a mislocation of the edge of the tool equivalent to a translation error of 1. Thus, the relative scale between translation and rotation depends on the size of the object being controlled.

A single unit of error should in some way be comparable to the positioning uncertainty in the kinematic model. If the error is reduced to four times smaller than the model uncertainty, for instance, then further reductions are unlikely to make meaningful impact on the positioning accuracy of the machine.

To choose a normalizing matrix for the error vector e, suppose the machine with the 150 mm cutter has an estimated model uncertainty of about 0.004 mm. The normalizing matrix will be:

$$\hat{e} = \begin{bmatrix} 1000 & 0 & 0 & 0 & 0 \\ 0 & 1000 & 0 & 0 & 0 \\ 0 & 0 & 1000 & 0 & 0 \\ 0 & 0 & 0 & 150000 & 0 \\ 0 & 0 & 0 & 0 & 150000 \end{bmatrix} e$$

so that errors which create $1/\mu m$ of error have a normalized value of 1.

The Jacobian in normalized coordinates is defined by $$J_n(\hat{Q}^{-1}\Delta \hat{q}) = -\hat{E}^{-1}\hat{e}$$

$$J_n = (\hat{E} J_n \hat{Q}^{-1})$$

$$J_n \hat{q} = -\hat{e}$$

Using the SVD of the normalized Jacobian $$J_n = USV^T$$

$$S(V^T \Delta \hat{q}) = -(U^T \hat{e})$$

The minimization problem can now be expressed in normalized, orthogonalized coordinates:

$$\Phi = (S(V^T \Delta \hat{q}) + U^T \hat{e})^T Q(S(V^T \Delta \hat{q}) + U^T \hat{e}) + (V^T \Delta \hat{q})^T G(V^T \Delta \hat{q})$$

The orthogonalized problem space implies that the elements of $V^T \Delta \hat{q}$ and $U^T \hat{e}$ are independent of each other and meaningfully equal in value. That is, changes in the $i^{th}$ element of $V^T \Delta \hat{q}$ only cause changes in the $i^{th}$ element of $U^T \hat{e}$. Thus, Q and G are set to be diagonal.

Let $G=S^{-1}$. The more singular the error direction, the larger the penalty on G, up to the point that when $\sigma_i=0$ the penalty is effectively infinite.

Let $Q=\lambda l$, where l is a scaled identity matrix. Motion in the orthogonal space is treated with equivalent penalty.

The following known minimal solution to $\Phi$ may be used:

$$\Delta \hat{q} = -V(SQS+G)^{-1} SQU^T \hat{e}$$

Substituting in the chosen values for Q and G, and recognizing that S, Q, and G are all diagonal gives:

$$\Delta \hat{q} = -V\left( \text{diag}\left( \frac{\sigma_i^2}{\sigma_i^3 + 1/\lambda} \right) \right) U^T \hat{e}$$

where diag $(x_i)$ indicates a diagonal matrix with terms $x_i$.

Denormalizing the equation above gives $$\Delta q = -\hat{Q}^{-1} V \left( \text{diag}\left( \frac{\sigma_i^2}{\sigma_i^3 + 1/\lambda} \right) \right) U^T \hat{E} e$$

Let $\lambda = w/\sigma_1^3$. This leaves a single design variable, w.

Figure 6:
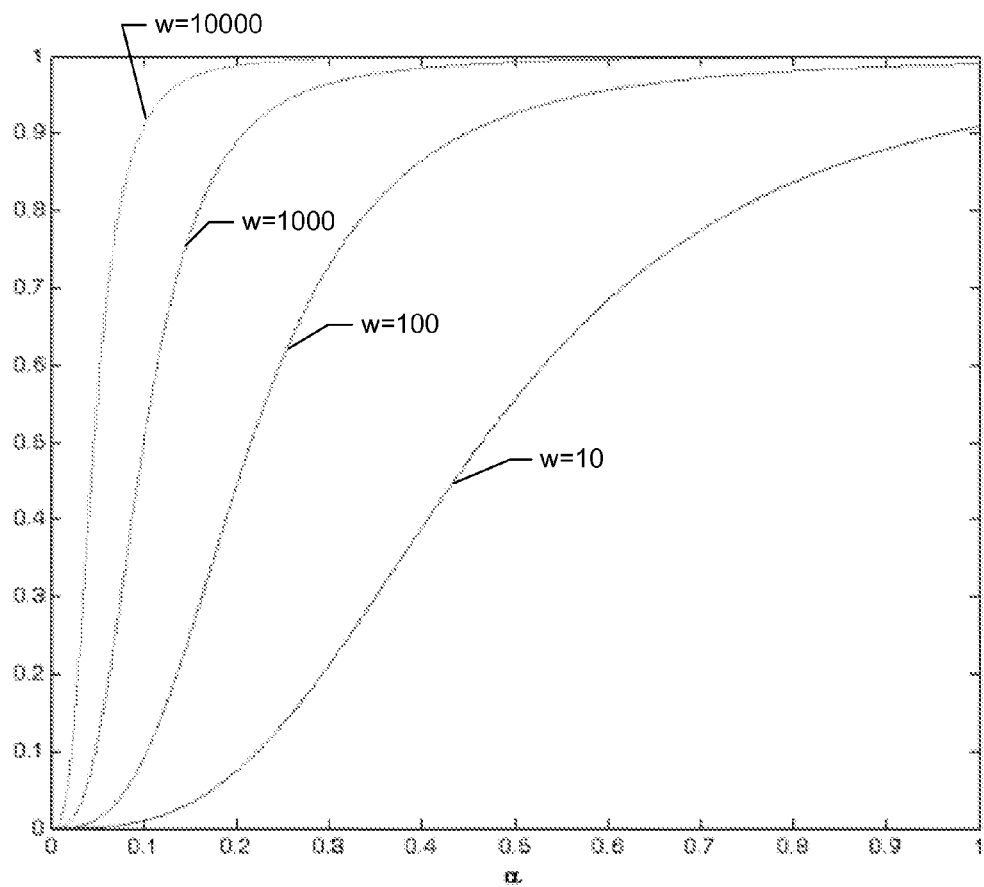
FIG. 6 is an illustration of scaling of error motion as a function of the ratio of singular values.

Additional reference is made to FIG. 6, which shows an asymptotic decay in motion along increasingly singular directions. The decay changes as the inverse of a cubic function. The decay is shown for different values of w: 10, 100, 1000, and 10,000. For example, w=1000 can produce scaling of 50% when $\sigma_i/\sigma_1$ is about 1/10. In other words, a singular value is preserved to at least 90% of its full compensation as long as $\sigma_i/\sigma_1 > 1/5$. The choice of w=1000 has been found to provide a good balance between damping and accuracy far from a singularity.

The invention claimed is:

1. A method of commanding a linkage to move an end body in a work space, the method comprising using a machine-based controller to:
   compute a manipulator Jacobian given a nominal linkage command;
   compute a normalized Jacobian from the manipulator Jacobian, a joint space normalizing matrix Q, and an error space normalizing matrix E; and
   use the normalized Jacobian and the Q and E matrices to produce a software compensation command to command a linkage to move an end body in a work space.

2. The method of claim 1, wherein using the normalized Jacobian and the Q and E matrices includes:
   identifying singular values, left singular vectors for end body motion, and right singular vectors for joint motion from a singular value decomposition of the nominalized Jacobian; and
   using the singular values, the singular vectors, and the Q and E matrices to determine the software compensation command for the linkage.

3. The method of claim 2, wherein identifying the singular values includes computing a singular value decomposition (SVD) of the normalized Jacobian to produce $USV^T$, where U and V are orthogonal matrices of the left and right singular vectors and where S is a diagonal matrix of the singular values.

4. The method of claim 3, wherein the software compensation command minimizes damping in directions of the right singular vectors that are associated with large singular values; and minimizes joint motion in the direction of the right singular vectors that are associated with small singular values.

5. The method of claim 3, wherein using the singular values includes calculating an approximation $S^\dagger$ to the inverse of the S matrix, where a deviation of the approximation $S^\dagger$ from the S matrix is a function of the $i^{th}$ singular value in the S matrix and a largest singular value.

6. The method of claim 5, wherein the approximation is adaptively weighted such that the joint motion along the right singular vectors decays along increasingly singular directions.

7. The method of claim 6, wherein the decay is the inverse of a cubic function.

8. The method of claim 5, wherein $$S^\dagger = \text{diag}\left( \frac{\sigma_i^2}{\sigma_i^3 + 1/\lambda} \right),$$

where $\sigma_i$ is the $i^{th}$ singular value in the diagonal of the S matrix.

9. The method of claim 5, wherein $$S^\dagger = \text{diag}\left( \frac{\sigma_i^2}{\sigma_i^3 + \sigma_1^3/w} \right),$$

where $\sigma_i$ is the $i^{th}$ singular value in the diagonal of the S matrix and $\sigma_1$ is the largest singular value in the S matrix.

10. The method of claim 9, wherein compensation in the direction of the $i^{th}$ singular vector is attenuated by 50% when $\sigma_i/\sigma_1$ is substantially 1/10.

11. The method of claim 5, wherein the nominal linkage command describes a desired pose of the linkage; and wherein the software compensation command is computed as $\Delta q = -Q^{-1} V S^\dagger U^T E e$, where e is pose error of the end body.

12. The method of claim 1, wherein the normalized Jacobian is computed as $\hat{J}_n = EJnQ^{-1}$.

13. The method of claim 1, wherein the E matrix normalizes error of an end body motion along translation and rotation axes of the end body.

14. The method of claim 1, wherein the Q matrix represents one or more smallest resolvable steps of the joint motion.

15. The method of claim 1, wherein the normalized Jacobian allows an accurate comparison of different types of joint motion, a comparison of different units, and controls relative accuracy of compensation against joint motion.

16. A method of commanding a linkage to move an end body in a space, the method comprising:
   computing a manipulator Jacobian $J_n$ given a nominal linkage command q;
   computing a singular value decomposition (SVD) of the Jacobian to produce a diagonal matrix of singular values;
   calculating an approximation $S^\dagger$ of the inverse of the diagonal matrix of singular values, where $$S^\dagger = \text{diag}\left(\frac{\sigma_i^2}{\sigma_i^3 + \sigma_1^3/w}\right),$$

where $\sigma_i$ is the $i^{th}$ singular value and $\sigma_1$ is a largest singular value in the diagonal matrix;

using the approximation $S^\dagger$ to produce a software compensation command; and moving the linkage according to the nominal linkage and software compensation commands.

17. The method of claim 16, wherein the SVD produces singular vectors, and wherein compensation in the direction of the $i^{th}$ singular vector is attenuated by 50% when $\sigma_i/\sigma_1$ is substantially 1/10.

18. A machine comprising a kinematic linage for moving an end body to a pose; and a controller for generating a software compensation command $\Delta q$ for the kinematic linkage given a nominal linkage command q, wherein generating the software compensation command $\Delta q$ includes:

computing a manipulator Jacobian $J_n$ given the nominal linkage command q;

computing a normalized Jacobian from the manipulator Jacobian $J_n$, a joint space normalizing matrix Q, and an error space normalizing matrix E;

identifying singular values, left singular vectors, and right singular vectors from a singular value decomposition of the normalized Jacobian $\hat{J}_n$; and using the singular values, the singular vectors, and the Q and E matrices to determine the software compensation command $\Delta q$ for the linkage.

19. The machine of claim 18, wherein the singular value decomposition of the normalized Jacobian produces $USV^T$, where U and V are orthogonal matrices of the left and right singular vectors and where S is a diagonal matrix of the singular values.

20. The machine of claim 19, wherein using the singular values includes calculating an approximation $S^\dagger$ to the inverse of the S matrix, and computing a deviation of the approximation $S^\dagger$ from the S matrix as a function of the $i^{th}$ singular value in the S matrix and a largest singular value.

21. An article comprising a processor and memory encoded with data for causing the processor to generate a software compensation command given a nominal linkage command, wherein generating the software compensation command includes:

computing a manipulator Jacobian given a nominal linkage command;

computing a normalized Jacobian from the manipulator Jacobian, a joint space normalizing matrix Q, and an error space normalizing matrix E; and using the normalized Jacobian and the Q and E matrices to produce the software compensation command.

22. The article of claim 21, wherein using the normalized Jacobian and the Q and E matrices includes:

identifying singular values, left singular vectors, and right singular vectors from a singular value decomposition of the normalized Jacobian; and using the singular values, singular vectors, and the Q and E matrices to determine the software compensation command.

23. The article of claim 22, wherein identifying the singular values includes computing a singular value decomposition (SVD) of the normalized Jacobian to produce $USV^T$, where U and V are orthogonal matrices of the left and right singular vectors and where S is a diagonal matrix of the singular values.

24. The article of claim 23, wherein the software compensation command minimizes damping in directions of the right singular vectors that are associated with large singular values; and minimizes motion in the direction of the right singular vectors that are associated with small singular values.

25. The article of claim 23, wherein using the singular values includes calculating an approximation $S^\dagger$ to the inverse of the S matrix, where a deviation of the approximation $S^\dagger$ from the S matrix is a function of the $i^{th}$ singular value in the S matrix and a largest singular value.

26. The article of claim 25, wherein the approximation is adaptively weighted such that motion along the right singular vectors decays along increasingly singular directions.

27. The article of claim 26, wherein the decay is the inverse of a cubic function.

28. The article of claim 25, wherein $$S^\dagger = \text{diag}\left(\frac{\sigma_i^2}{\sigma_i^3 + 1/\lambda}\right),$$

where $\sigma_i$ is the $i^{th}$ singular value in the diagonal of the S matrix.

29. The article of claim 25, wherein $$S^\dagger = \text{diag}\left(\frac{\sigma_i^2}{\sigma_i^3 + \sigma_1^3/w}\right),$$

where $\sigma$ is the $i^{th}$ singular value in the diagonal of the S matrix and $\sigma_1$ is a largest singular value in the S matrix.

30. The article of claim 29, wherein compensation in the direction of the $i^{th}$ singular vector is attenuated by 50% when $\sigma_i/\sigma_1$ is substantially 1/10.

31. The article of claim 25, wherein the nominal linkage command describes a desired pose of a linkage; and wherein the software compensation command is computed as $\Delta q = -Q^{-1}VS^\dagger U^T Ee$, where e is pose error of an end body.

32. The article of claim 21, wherein the normalized Jacobian is computed as $\hat{J}_n = EJnQ^{-1}$.

33. The article of claim 21, wherein the E matrix normalizes error of end body motion along translation and rotation axes of the end body.

34. The article of claim 21, wherein the Q matrix represents one or more smallest resolvable steps of the joint motion.

* * * * *